United States Patent Office 3,770,722
Patented Nov. 6, 1973

3,770,722
6 - [ALPHA - (ARYL SUBSTITUTED)ACYLAMINO-ACYLAMINO]PENICILLANIC ACIDS AND DERIVATIVES THEREOF
Gene M. Bright and Ernest S. Hamanaka, Groton, Conn., assignors to Pfizer Inc., New York, N.Y.
No Drawing. Continuation-in-part of abandoned application Ser. No. 117,758, Feb. 22, 1971. This application Oct. 4, 1971, Ser. No. 186,413
Int. Cl. C07d 99/16
U.S. Cl. 260—239.1                8 Claims

ABSTRACT OF THE DISCLOSURE

A novel series of antibacterial agents; namely, 6-[α-(aryl substituted)acylaminoacylamino]penicillanic acids of the formula

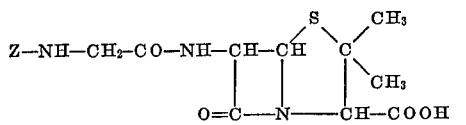

the non-toxic salts, esters and amides thereof wherein Z is $RR_1CH$—CO—; R is phenyl, substituted phenyl or thienyl; $R_1$ is hydrogen or COOH; and intermediates therefor of the above formula wherein Z is hydrogen.

CROSS-REFERENCE TO RELATED APPLICATION

This application is a continuation-in-part of our copending application Ser. No. 117,758, filed Feb. 22, 1971, and now abandoned.

BACKGROUND OF THE INVENTION

This invention relates to a novel series of broad-spectrum antibacterial agents and, more particularly, to a series of 6 - [-α(aryl substituted) - acylaminoacylamino] penicillanic acids, the non-toxic salts, esters and amides thereof; and to intermediate therefor.

Recent developments in the chemistry of penicillin antibiotics have given rise to (1) 6-acylaminoacylaminopenicillanic acids in which the 6-acylaminoacylamino moiety is

HOOC—X—CO—NH—CHR'—CO—NH—    (II)

wherein X is, inter alia, a direct linkage, a divalent alkyl group of 1 to 6 carbon atoms, or phenylene group; and R' is alkyl of 1 to 6 carbon atoms, phenyl, phenylalkyl or a heterocyclic group (U.S. 3,320,240, issued May 16, 1967); (2) 6-aminoacylaminoacylaminopenicillanic acids where the 6-aminoacylaminoacylamino moiety is, inter alia,

H₂N—CHR₁'—CO—NH—CHX₁—CO—NH—    (II-A)

wherein each $X_1$ and $R_1'$ is, for example, hydrogen, lower alkyl, phenyl and phenyl lower alkyl (U.S. 3,340,252, issued Sept. 5, 1967). Further, a variety of 6-(α-substituted acylamino)penicillanic acids wherein the acylamino moiety is, for example, α-carboxyarylacetylamino (U.S. 3,142,673, issued July 28, 1964); glycylamino or substituted glycylamino (U.S. 3,080,356, issued Mar. 5, 1963) are known.

SUMMARY OF THE INVENTION

There has now been found a novel series of broad-spectrum antibacterial agents; namely, 6-[α-(aryl substituted)acylaminoacylamino]penicillanic acids of the formula

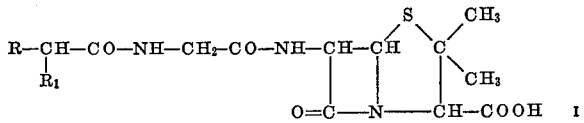

and the non-toxic salts, esters and amides thereof wherein R is selected from the group consisting of 3-thienyl, phenyl and substituted phenyl wherein the substituent is selected from the group consisting of chloro, bromo, fluoro lower alkyl, lower alkoxy, di(lower alkyl) amino and trifluoromethyl; $R_1$ is selected from the group consisting of hydrogen and carboxy.

The penicillanic acid derivatives described herein can exist in optically inactive forms as well as in optically active forms by reason of the asymmetrical carbon atoms present in the substituent group at the 6-position in those compounds wherein $R_1$ is carboxy. Such forms are included within the scope of this invention.

Also included within the scope of this invention are the non-toxic cationic, e.g., the pharmaceutically-acceptable, salts of the novel compounds of this invention in which at least one of the one or more acid groups present is involved in salt formation. Salts such as the sodium, aluminum, potassium, calcium, magnesium, ammonium and substituted ammonium salts, e.g., procaine, dibenzylamine, N,N'-dibenzylethylenediamine, N,N'-bis(dehydroabietyl)ethylenediamine, 1-ephenamine, N-ethylpiperidine, N-benzyl-β-phenethylamine, triethylamine, as well as salts with other amines which have been used to form salts with benzylpenicillin are useful for the preparation of pharmaceutically-elegant compositions of these valuable antibiotics.

As those skilled in the art will recognize, a wide variety of esters of the herein described compounds is possible, including those in which the carboxy group of the acyl moiety on the 6-amino group (when $R_1$ is carboxyl) is esterified. Typical ester groups are those disclosed in U.S. Patent 3,574,189, issued Apr. 6, 1971, and Belgium Patent 721,515, granted Mar. 27, 1969. The first patent describes a large number of alkyl, substituted alkyl, aryl substituted aryl, alkenyl, aralkyl, alkynyl and cycloalkyl esters of the α-carboxy group of α-carboxyarylmethylpenicillins. The second patent describes acyloxyalkyl esters of the 3-carboxy group of the penicillanic acid moiety.

The favored esters of the herein described compounds wherein $R_1$ is carboxy are those in which said carboxy group is esterified with benzyl, phenyl, substituted phenyl, indanyl, ω-[(lower alkyl) anilino]lower alkyl; e.g., 2-(N-ethylanilino)ethyl and acyloxy(lower alkyl). The preferred esters are those wherein at least the 3-carboxy group of the penicillanic acid moiety is esterified with an acyloxy(lower alkyl) group of the formula

—CH(R₂)OCOW wherein $R_2$ is selected from the group consisting of hydrogen and lower alkyl; and W is selected from the group consisting of lower alkyl, phenyl and substituted phenyl wherein the substituent is selected from the group consisting of chloro, bromo, fluoro, lower alkyl, lower alkoxy and trifluoromethyl.

The amide derivatives of the compounds of this invention also afford a rather wide range of structural types. The amide function can exist in any or all of the carboxy groups present in a given compound of this invention. The amide group (—CONB'B'') can be simple or substituted: that is, B' and B'' can be hydrogen, alkyl, aryl, substituted aryl, aralkyl, substituted aralkyl, cycloalkyl; and B' and B'' when taken together with the nitrogen atom to which they are attached can be a 5- or 6-membered ring, e.g., morpholino, piperazino, piperidino, pyrolo, thiomorpholino, imidazolo. The favored amides are those disclosed in U.S. 2,593,852, issued Apr. 22, 1952, for benzylpenicillin. The preferred amides are the unsubstituted amides (—CONH$_2$). Of the lower alkyl, lower alkoxy and lower alkanoyloxy groups, those having up to and including 5 carbon atoms are favored because of the availability of the necessary reactants.

The novel antibacterial products of this invention are of value as additives to materials such as fuels and cutting oils which are subject to bacterial deterioration and are useful in soaps and shampoos and in topical compositions for treatment of wounds. They are also remarkably effective in treating a number of infections caused by susceptible gram-negative and gram-positive bacteria in poultry and animals, including man. For such purposes, the pure materials or mixtures thereof with other antibiotics can be employed. They may be administered alone or in combination with a pharmaceutical carrier on the basis of the chosen route of administration and standard pharmaceutical practice. For example, they may be administered orally in the form of tablets containing such excipients as starch, milk sugar, certain types of clay, etc. or in capsules alone or in admixture with the same or equivalent excipients. They may also be administered orally in the form of elixirs or oral suspensions which may contain flavoring or coloring agents or be injected parenterally; that is, intramuscularly or subcutaneously. For parenteral administration they are best used in the form of a sterile solution which may be aqueous, such as water, isotonic saline, isotonic dextrose, Ringer's solution, or non-aqueous, such as fatty oils of vegetable origin (cotton seed, peanut oil, corn, sesame) and other non-aqueous vehicles which will not interfere with the therapeutic efficiency of the preparation and are non-toxic in the volume or proportion used (glycerol, propylene glycol, sorbitol). Additionally, compositions suitable for extremporaneous preparation of solutions prior to administration may advantageously be made. Such compositions may include liquid diluents, for example, propylene glycol, diethyl carbonate, glycerol, sorbitol, etc., buffering agents as well as local anesthetics and inorganic salts to afford desirable pharmacological properties.

DETAILED DESCRIPTION OF THE INVENTION

The novel and valuable compounds of this invention are prepared from 6-aminopenicillanic acid or an ester or an amide thereof by any of several known methods for introducing an acyl substituent into a primary amine. They can, for example, be prepared by the acylation in a reaction-inert solvent of 6-aminopenicillanic acid or an ester or amide thereof with a reactive functional derivative of the carboxy group of an appropriate acid of the formula

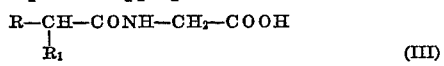
(III)

wherein R and R$_1$ are as defined above.

Alternatively, they can be prepared by the acylation in a reaction-inert solvent of 6-glycylaminopenicillanic acid (Formula IV)

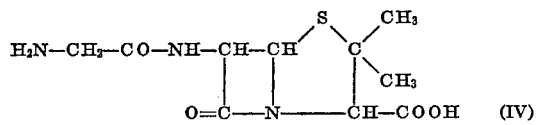

or a derivative thereof; e.g., an ester or amide, with a reactive functional derivative of the carboxy group of a compound of Formula V

wherein R and R$_1$ are as defined above.

Suitable reactive functional derivatives of acids of Formulae III and V are the acid anhydrides, especially the mixed anhydrides with other carboxylic acids such as ethoxy and isobutoxy carbonic acid. The acid chlorides or bromides of acids of Formula V and of Formula III acids wherein R$_1$ is hydrogen are also useful acylating agents.

The acylation reaction is normally conducted at a pH value of from about 6 to about 9 and at a temperature of from about 0° C. to about 50° C. It can, for example, be conducted in an aqueous reaction medium of an unstable emulsion of water and a water-immiscible organic solvent such as isobutyl ketone and lower alkyl acetates over the pH range of from about 6 to 9 in aqueous solution (water or water-acetone) at a temperature of from 0° C. to 50° C.

When the compound of Formula V is an arylmalonic acid (R$_1$=carboxy) one of the carboxy groups is generally protected by conversion to an ester, e.g., the phenyl or benzyl ester or other easily removable group prior to formation of a reactive functional derivative such as the acid chloride at the other carboxy group. Alternatively, the arylmalonic acid is transformed to an arylcarboxy ketene ester

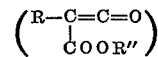

wherein R'' represents an ester moiety.

Utilization of an arylcarboxy ketene ester as acylating agent for 6-glycylaminopenicillanic acid or derivative thereof produces compounds of Formula I wherein R$_1$ is a —COOR'' group. The arylcarboxy ketene esters are readily prepared by the procedure of U.S. Pat. 3,574,189, issued Apr. 6, 1971. The procedure comprises reacting the arylmalonic acid with a stoichiometric amount of a halogenating agent selected from the group consisting of P(X')$_5$, P(X')$_3$ and SO(X')$_2$ wherein X' is chloro or bromo at temperatures ranging from about 0° C. to about 50° C. for periods ranging from about one hour to about ten hours. The reaction is conducted in the presence of a solvent system, preferably a reaction-inert solvent system. Suitable solvents are dialkyl ethers, e.g., diethyl ether, dipropyl ether, dimethyl ethers of ethylene glycol and propylene glycol, methylene chloride and chloroform. The products are isolated by distillation in vacuo. The aryl chloro(or bromo)carbonyl ketenes thus produced are then reacted with the appropriate alcohol to give an arylcarboxy ketene ester. The reaction is conducted on a 1:1 molar ratio at a temperature of from about —70° C. to about 30° C. A reaction-inert solvent, such as ethyl ether, dioxane, methyl ether, methylene chloride or chloroform, is desirably used to permit better mixing and control of the reaction. A tertiary amine can be used as acid acceptor, if desired, to remove the hydrogen halide produced for formation of the ester. The ester need not be isolated from the reaction mixture but can be used directly in the acylation reaction. It can, of course, be isolated by standard procedures, e.g., by removal of the solvent at a lower temperature; that is, below 20° C.

The acylation of 6-glycylaminopenicillanic acid or derivative thereof with an arylcarboxy ketene ester is conducted at a temperature of from about —70° C. to about 50° C. and preferably at a temperature of from 0° C. to about 50° C. in a reaction-inert solvent, such as ethyl acetate, dioxane, tetrahydrofuran, methyl isobutyl ketone, chloroform and methylene chloride. The reaction period is generally from a few minutes up to about five hours. The products are isolated by conventional methods.

Alternatively, the novel compounds of this invention can be prepared by the reaction of 6-aminopenicillanic acid or of 6-glycylaminopenicillanic acid (or an ester or amide thereof) with the appropriate acid reactant in the presence of a condensing agent; e.g., a carbodiimide such as 1,3-dicyclohexylcarbodiimide, hexachlorocyclotriphosphatriazine or an alkoxyacetylene such as ethoxyacetylene. Additionally, the appropriate acid azide or an active ester or thio ester of the carboxy moiety of the acid reactant with, for example, N-hydroxyphthalimide, N-hydroxysuccinimide, a phenol or thiophenol, can be used as acylating agent. Further, the 6-aminopenicillanic acid or 6-glycylaminopenicillanic acid (ester or amide thereof) can first be converted to a mono- or disilyl derivative by reaction with a trialkylsilyl halide or trialkylsilylamine which is then acylated with an appropriate organic acid acylating agent (a carboxylic acid, acid anhydride or acid halide) and hydrolyzed to remove the protecting group (the "silyl" method) as described in U.S. Pat. 3,249,622, issued May 3, 1966.

The acylation can also be conducted in a non-aqueous solvent system. In such instances, an amide salt, e.g., the triethylamine or N-ethylpiperidine salt of the 6-glycylaminopenicillanic acid or of the 6-aminopenicillanic acid reactant serves as suitable form of the reactant because of its solubility in the non-aqueous system. The acylation when conducted in a non-aqueous system is generally conducted at an initial temperature of as low as −40° C. during the combining of the reactants and is then gradually raised to room temperature or higher, e.g., about 50° C., if necessary.

In addition to the above purely chemical techniques of acylation, a sonochemical technique; that is, the application of vibrations of ultrasonic frequency (35,000 to 90,000 cycles per second) as described in U.S. Pat. 3,079,314, issued Feb. 26, 1963, can also be used to achieve acylation, especially acylation with an acid halide or anhydride. Acylation under such conditions is rapid and permissive of a wide range of reaction media, aqueous and non-aqueous alike, homogeneous and non-homogeneous, including emulsified systems.

The esters of this invention, compounds of Formula I wherein at least one carboxy group is present as an acyloxy(lower alkyl) ester, are prepared by reacting an alkali metal salt (sodium, potassium, lithium) of a compound of Formula I wherein at least one carboxy group is present with the appropriate acyloxy(lower alkyl) halide (chloride or bromide) of the formula

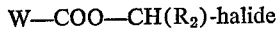

W—COO—CH($R_2$)-halide wherein W and $R_2$ are as defined above. The reaction is normally conducted in a reaction-inert solvent such as tetrahydrofuran, dimethylformamide, dimethylsulfoxide or hexamethylphosphoramide. In practice, the halide is added, preferably dropwise, to a solution or suspension of an alkali metal salt of the compound of Formula I. At least one equivalent of the halide reactant is added for each carboxy group present; but, in certain cases, it may be advantageous to employ as much as a 50 percent excess. The reaction may be carried out at temperatures of from 0° C. to 50° C. with a preferred range of from 20° C. to 30° C. Reaction time will vary according to the temperature employed and the reactivity of the appropriate starting materials. Normally, the reaction period will range from one to twenty hours.

The acyloxy(lower alkyl) esters of Formula I compounds in which only the carboxy group of the aminopenicillanic acid moiety is esterified can also be prepared by the above described acylation procedures but using the appropriate acyloxy(lower alkyl) ester of 6-amino- or 6-glycylaminopenicillanic acid in place of the non-esterified 6-aminopenicillanic acid or 6-glycylaminopenicillanic acid. The acyloxy(lower alkyl) esters of 6-aminopenicillanic acid and of 6-glycylaminopenicillanic acid are prepared according to methods described in Belgian 721,515 and by Daehne et al., J. Med. Chem. 13, 607–612 (1970). The acyloxy(lower alkyl) 6-glycylaminopenicillanates are also prepared by acylating the appropriate acyloxy(lower alkyl) 6-aminopenicillanate with $H_2N$—CH($R_1$)COOH (wherein $R_1$=H or —COO$C_6H_5$) in the presence of a carbodiimide or with $H_2N$—$CH_2$—COCl—HCl.

The acyloxy(lower alkyl) halides are synthesized from the corresponding acid chlorides and aldehydes or ketones in accordance with the general procedures of Ulich et al., J. Am. Chem. Soc. 43, 660 (1921) and Euranto et al., Acta. Chem. Scand. 20, 1273 (1966). The formation of esters from acid salts and alkyl halides is well documented in the chemical literature (Zook and Wagner, "Synthetic Organic Chemistry," John Wiley and Sons, Inc., New York, 1956, p. 484).

In still another method, compounds of Formula I wherein $R_1$ is hydrogen can be prepared by reaction of 6-aminopenicillanic acid with 2-benzyloxazolin-5-one. The reaction is conveniently carried out in a non-aqueous system, such as in methylene chloride, at room temperature under nitrogen for from 4 to 12 hours. An amine salt, e.g., triethylamine or N-ethylpiperidine salt of 6-aminopenicillanic acid is generally used under such conditions because of its solubility in the non-aqueous solvent system.

The necessary starting materials—6-aminopenicillanic acid, 6-glycylaminopenicillanic acid, the acrylacetic and arylmalonic acids (Formula V, $R_1$=H and COOH, respectively) and several of the acyloxy(lower alkyl) 6-aminopenicillanates—are known compounds.

The novel penicillins described herein exhibit in vitro activity against a wide variety of microorganisms, including both gram-positive and gram-negative bacteria. Their useful activity can readily be demonstrated by in vitro tests against various organisms in a brain-heart infusion medium by the usual two-fold serial dilution technique. The in vitro activity of the herein described compounds renders them useful for topical application in the form of ointments, creams and the like or for sterilization purposes, e.g., sick room utensils.

These novel penicillins are also effective antibacterial agents in vivo in animals, including man, not only via the parenteral route of administration but also by the oral route of administration.

The oral and parenteral dosage levels for the herein described compounds are, in general, on the order of from about 25–200 mg./kg. and from about 10–100 mg./kg. of body weight per day, respectively.

Many of the penicillin ester compounds of this invention exhibit improved absorption on oral administration over that produced by the corresponding free acid or alkali metal salt forms. They therefore, represent convenient and effective dosage forms of the novel penicillins of Formula I above.

Further, many of the esters, especially the acyloxy (lower alkyl) esters described herein, although inactive or of relatively low activity against gram-negative organisms per se are when administered orally to animals, including man, metabolized to the parent acid which has a wide spectrum of activity against gram-positive and gram-negative bacteria. They thus serve as sources of the parent compounds since they are biologically converted in vivo to said compounds. The rate of metabolic conversion of such esters to the parent acid occurs at such a rate as to provide an effective and prolonged concentration of the parent acid in the animal body. In effect, such esters act as depot sources for the parent acid. Especially useful in this respect are the acyloxy(lower alkyl) esters such as the benzoyloxymethyl-, acetoxymethyl-, acetoxyethyl-, pivaloyloxymethyl- and α-ethylbutyryloxymethyl esters.

Also effective as antibacterial agents are acyloxyalkyl esters of Formula I compounds wherein the acyloxyalkyl ester moiety is —C($R_3R_4$)—O—CO—W' in which $R_3$ is hydrogen and $R_4$ is selected from the group consisting of alkyl, alkoxyalkyl and alkylthioalkyl each containing up to 6 carbon atoms, cycloalkyl of from 3 to 6 carbon atoms, phenylalkyl and mono- and disubstituted phenylalkyl wherein said substituent is selected from the group consisting of alkyl containing up to 3 carbon atoms, chlorine, bromine, fluorine and alkoxy and alkylthio each containing up to 2 carbon atoms, alkyl, alkoxyalkyl and alkylthioalkyl each containing up to 6 carbon atoms, cycloalkyl of from 3 to 6 carbon atoms;

$R_3$ and $R_4$ when taken together with the carbon atom to which they are attached form a ring system of the formula

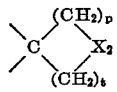

wherein $X_2$ is selected from the group consisting of $CH_2$, O, S, and $p$ and $t$ are each integers of from 1 to 3;

W' is selected from the group consisting of cycloalkyl of from 3 to 8 carbon atoms, phenylalkyl and mono- and disubstituted phenylalkyl wherein said alkyl portion consists of 1 to 3 carbon atoms and said substituents are each chosen from the group consisting of chloro, bromo, fluoro, lower alkoxy, lower alkylthio, lower alkanoylamino lower alkyl, trifluoromethyl and N,N-di(n-propyl) sulfamyl, phenyl and mono- and disubstituted phenyl wherein the substituents are chosen from the group consisting of lower alkyl, lower alkoxy, chloro, bromo, fluoro and trifluoromethyl.

EXAMPLE I

6-[N-(α-phenylacetyl)glycylamino]penicillanic acid
(via acylation of 6-aminopenicillanic acid)

The triethylamine salt of 6-aminopenicillanic acid (3.17 g., 0.01 mole) is added portionwise over a one-half hour period to a solution of 2-benzyloxazolin-5-one (1.75 g., 0.01 mole) in methylene chloride (40 ml.) under an atmosphere of nitrogen. The mixture is stirred overnight then the solvent removed under reduced pressure. The residue is taken up in water-ethyl acetate (50 ml. of each), and pH adjusted to 3.0 with 1 N hydrochloric acid. The ethyl acetate layer is separated and the aqueous phase extracted with ethyl acetate (50 ml.). The combined ethyl acetate extracts are dried ($Na_2SO_4$), then evaporated to dryness. A solution of N-ethylpiperidine (2.0 g.) in methylene chloride (50 ml.) is added to the residue, the mixture stirred, and then evaporated under reduced pressure until a thick suspension forms. The suspension is filtered, washed with ether and dried to give the N-ethylpiperidine salt of the title compound (5.0 g.).

The product is purified by dissolution in ethyl acetate-water (50 ml. of each) and acidification of the mixture to pH 2.0 with aqueous phosphoric acid. The ethyl acetate layer is separated, mixed with water (50 ml.) and the pH adjusted to 8.0 with saturated aqueous sodium bicarbonate. The ethyl acetate layer is discarded, the aqueous phase extracted with ethyl acetate, separated therefrom and adjusted to pH 2.0 with phosphoric acid. The acid solution is extracted with ethyl acetate, the extract dried ($Na_2SO_4$) and evaporated. N-ethylpiperidine (1.872 g.) in methylene chloride (50 ml.) is added to the residue. The N-ethylpiperidine salt is isolated as described above (2.02 g.).

EXAMPLE II

6-[N-(α-phenylacetyl)glycylamino]penicillanic acid
(via acylation of 6-glycylaminopenicillanic acid Triethylamino (0.606 g., 6 mm.) is added to a suspension of 6-glycylaminopenicillanic acid (0.819 g., 3 mm.) in methylene chloride (40 ml.) at room temperature. The mixture is stirred for fifteen minutes, and phenylacetyl chloride (0.462 g., 3 mm.) added. Stirring is continued for two hours, then the reaction mixture evaporated to dryness. The residue is taken up in ethyl acetate and the solution layered with an equal volume of water. The pH is adjusted to 2.6 with 6 N hydrochloric acid, the mixture thoroughly agitated and the aqueous phase separated. An equal volume of fresh water is added to the ethyl acetate and the pH raised to 7.5 with saturated aqueous bicarbonate. The aqueous layer is separated and an equal volume of ethyl acetate added to it. The pH is brought to 2.6 with 6 N hydrochloric acid, the ethyl acetate layer separated and dried ($Na_2SO_4$) to a foam (0.9 g.).

The residue is dissolved in ethyl acetate-acetone (1–1), N-ethylpiperidine (0.5 ml.) added and after one-half hour of stirring ethyl ether is added to precipitate the N-ethylpiperidine salt of the title product. It is recovered by filtration, washed with ether, and dried (0.55 g.). It is identical to the product of Example I.

Repetition of this procedure but using (3-thienyl) acetyl chloride in place of phenylacetyl chloride produces 6 - [N - (α - (3 - thienyl)acetyl)glycylamino]penicillanic acid and its N-ethylpiperidine salt.

EXAMPLE III

6-[N-(α-phenylacetyl)glycylamino]penicillanic acid
(via carbodiimide condensing agent)

To phenaceturic acid (9.66 g.) in tetrahydrofuran (75 ml.) there is added 1,3-dicyclohexylcarbodiimide (10.3 g.) in tetrahydrofuran (40 ml.) followed by a solution of 6-aminopenicillanic acid (10.8 g.) in 300 ml. of water: tetrahydrofuran (1:1) containing sufficient sodium bicarbonate to give a pH of 7.8. The mixture is stirred at room temperature for two hours, then filtered to remove 1,3-dicyclohexylurea. The filtrate is diluted to 1000 ml. with cold water, the aqueous layer adjusted to pH 2.8 with phosphoric acid and extracted with 2×200 ml. of cold nitromethane. The combined nitromethane extracts are washed with 1/10 volume of water and then extracted at pH 7.5 with one-half volume of water. The aqueous layer is washed with ether and lyophilized to give the sodium salt of the title product.

EXAMPLE IV

6-[N-(p-tolylacetyl)glycylamino]penicillanic
acid (via an active ester)

(A) A mixture of 6-glycylaminopenicillanic acid (1.37 g., 5.0 mm.), triethylamine (1.01 g., 10.0 mm.) and methylene chloride (75 ml.) is stirred at room temperature for one hour. The resulting solution is cooled to 0° C. and stirred under an atmosphere of nitrogen. A solution of the N-hydroxysuccinimide ester of p-tolylacetic acid (1.24 g., 5.0 mm.) in methylene chloride (25 ml.) is added dropwise over a one-half hour period. The solution is allowed to warm to room temperature and stirred for an additional three hours. An equal volume of water is added and the reaction mixture adjusted to pH 2.0 with 6 N hydrochloric acid. The methylene chloride phase is separated, washed with brine and dried with anhydrous sodium sulfate. Removal of the solvent under reduced pressure gives the product as a foam. The foam is taken up in ethyl acetate and the ethyl acetate solution extracted with aqueous sodium bicarbonate. Fresh ethyl acetate is added to the aqueous solution which is adjusted to pH 2.5 with 6 N hydrochloric acid. The ethyl acetate phase is separated and the aqueous phase extracted again with ethyl acetate. The combined ethyl acetate extracts are washed with water, followed by brine and dried ($Na_2SO_4$). Removal of the ethyl acetate gives the product.

It is converted to the sodium salt by extracting an ethyl acetate solution of the acid form with aqueous sodium bicarbonate until the aqueous extract has a pH of 7.0, washing the aqueous extract with ethyl acetate and freeze-drying the aqueous solution.

The N-hydroxysuccinimide ester is prepared by reacting equimolar quantities of p-tolylacetic acid, N-hydroxysuccinimide and dicyclohexylcarbodiimide in N,N-dimethylformamide at room temperature for 1.5 hours. The mixture is filtered, the filtrate poured into a large volume of water, and the product extracted with ethyl acetate. The extract is washed with water, dried ($Na_2SO_4$) and evaporated to give the ester.

(B) Repetition of this procedure but using N-hydroxyphthalimide in place of N-hydroxysuccinimide produces the same product.

EXAMPLE V

Acetoxymethyl 6-[(N-phenylacetyl)glycylamino]
penicillanate

To 35 ml. of dry dimethylformamide contained in a 125 ml. three-necked flask under a nitrogen atmosphere is added 4.77 g. (0.012 mole) of sodium 6-[(N-phenylacetyl)glycylamino]penicillanate followed after ten minutes by the dropwise addition of 1.40 g. (0.0129 mole) of chloromethyl acetate. The reaction mixture is allowed to remain at room temperature overnight. The dimethylformamide is evaporated in vacuo, and the residue taken up in acetone. The sodium chloride is removed by filtration and the filtrate evaporated in vacuo to provide the crude product.

One-half of the crude product is purified by chromatography on Polyamide CC-6 with ethyl acetate. The first fraction (125 ml.) is concentrated in vacuo to provide the product as an oil.

EXAMPLE VI

Pivaloyloxymethyl 6-[(N-phenylacetyl)glycylamino]
penicillanate

To a stirred solution of phenaceturic acid (0.01 mole) in N,N-dimethylformamide (10 ml.) is added N-hydroxysuccinimide (1.2 g., 0.01 mole) and the mixture stirred for ten minutes. Dicyclohexylcarbodiimide (2.1 g., 0.01 mole) in N,N-dimethylformamide (3 ml.) is added and the mixture stirred for 1.5 hours at room temperature. A heavy precipitate of N,N'-dicyclohexylurea is filtered off and the filtrate poured into water (100 ml.). The mixture is extracted with ethyl acetate (2×100 ml.). The ethyl acetate extract is washed with water (2×100 ml.), dried (Na$_2$SO$_4$), filtered and evaporated under reduced pressure to give the N-hydroxysuccinimide ester of phenaceturic acid.

A solution of pivaloyloxymethyl 6-aminopenicillanate (0.01 mole) in methylene chloride (25 ml.) is cooled to 0° C. and stirred under an atmosphere of nitrogen. A solution of the N-hydroxysuccinimide ester of phenaceturic acid (0.01 mole) in methylene chloride (25 ml.) is added dropwise over a one-half hour period. The solution is allowed to warm to room temperature and stirred for an additional three hours. An equal volume of water is added and the reaction mixture adjusted to pH 2.0 with 6 N hydrochloric acid. The methylene chloride phase is separated, washed with brine and dried with anhydrous sodium sulfate. Removal of the solvent under reduced pressure gives the product.

This procedure is repeated but using the appropriate ester of 6-aminopenicillanic acid to produce acyloxymethyl esters wherein the acyloxymethyl group (—CH(R$_2$)—O—CO—W)— is:

| R$_2$: | W |
|---|---|
| H | C$_2$H$_5$ |
| H | CH(CH$_3$)$_2$ |
| H | CH(C$_2$H$_5$)$_2$ |
| H | n-C$_3$H$_7$ |
| H | C$_6$H$_5$ |
| H | 4-ClC$_6$H$_4$ |
| H | 4-(CH$_3$)C$_6$H$_4$ |
| H | 3-FC$_6$H$_4$ |
| H | 2-(CH$_3$O)C$_6$H$_4$ |
| H | 2-(CF$_3$)C$_6$H$_4$ |
| H | 4-BrC$_6$H$_4$ |
| H | 4-(n-C$_4$H$_9$)C$_6$H$_4$ |
| CH$_3$ | CH$_3$ |
| CH$_3$ | CH(C$_2$H$_5$)$_2$ |
| C$_2$H$_5$ | C$_2$H$_5$ |
| CH$_3$ | C(CH$_3$)$_3$ |
| C$_2$H$_5$ | C$_6$H$_5$ |
| C$_3$H$_7$ | C$_6$H$_5$ |
| CH$_3$ | n-C$_3$H$_7$ |

EXAMPLE VII

6-[N-(α-phenyl-α-carbophenoxyacetyl)glycylamino]
penicillanic acid

Triethylamine (0.835 ml., 2 equivalents) is added to a suspension of 6-glycylaminopenicillanic acid (0.819 g.) in methylene chloride (40 ml.) and the mixture stirred for one-half hour at room temperature. Triethylamine (0.41 ml., 1 equivalent) is added followed by the acid chloride of the monophenyl ester of phenylmalonic acid (1.1 g. of 75% pure material). The mixture is stirred for 2.5 hours at room temperature then evaporated to dryness under reduced pressure. The residue is dissolved in ethyl acetate-water (1—1), the mixture thoroughly shaken and the ethyl acetate phase separated. The aqueous phase (pH 8.2) is adjusted to pH 2.6 with 6 N hydrochloric acid and extracted with ethyl acetate (2×25 ml.). The ethyl acetate extract is dried (Na$_2$SO$_4$) and evaporated under reduced pressure to a foam (1.2 g.). The foam is dissolved in ethyl acetate (20 ml.), and excess (10%) N-ethylpiperidine added. The gummy precipitate which separates is triturated with ether to give a cream colored solid which is dried in vacuo (1.06 g.).

EXAMPLE VIII

Disodium 6-[N-(α-phenyl-α-carboxyacetyl)glycylamino]
penicillanic acid

The phenyl ester of Example VII (1.0 g.) is stirred in pH 9.0 buffer (250 ml.) for two hours. The pH falls to 8.45 and the odor of phenol is observed. The reaction mixture is extracted with ether (2×50 ml.) and the pH of the reaction mixture brought to 2.6 with 6 N hydrochloric acid. The acid solution is extracted with ether (3×133 ml.), the ether extract dried (Na$_2$SO$_4$) and evaporated to dryness. The residue is taken up in acetone (50 ml.) and treated with an excess of sodium 2-ethyl hexanoate in acetone to precipitate the disodium salt of 6 - [N - (α - phenyl - α - carboxyacetyl)glycylamino] - penicillanic acid. The product is filtered off, washed with acetone and dried in vacuo (300 mg.).

(The buffer is prepared by adjusting the pH of 2000 ml. of a solution containing 61.8 g. of boric acid and 74.56 g. of potassium chloride to 9.0 by the addition of a sufficient volume of 0.50 molar sodium hydroxide solution.)

EXAMPLE IX

6-[N-(α-phenyl-α-carbophenoxyacetyl)glycylamino]
penicillanic acid (via the "silyl" method)

A mixture of 6-glycylaminopenicillanic acid (0.015 mole), triethylamine (0.03 mole) and methylene chloride (185 ml.) is stirred at room temperature for fifteen minutes. Trimethylsilyl chloride (0.03 mole) is added and the reaction mixture stirred for fifteen minutes at room temperature.

To the solution thus obtained is added triethylamine (1.82 g.). A solution of the acid chloride of the monophenyl ester of phenylmalonic acid (4.52 g.) in methylene chloride (20 ml.) is added dropwise at 0° C.–5° C. with stirring. The mixture is allowed to stand for three hours, then poured into ethyl acetate (250 ml.) and cooled to 0° C.–5° C. Isopropanol (5 ml.) is added and after one hour the mixture filtered. A solution of sodium 2-ethyl hexanoate in ethyl acetate is added to the filtrate to provide a pH of 7.5. The sodium salt of the title compound is recovered by evaporation of the solvent in vacuo or by addition of a large volume of ether.

EXAMPLE X

Pivaloyloxymethyl 6-glycylaminopenicillanate

Sodium bicarbonate (0.25 mole) is added to a rapidly stirred suspension of glycyl chloride hydrochloride (0.125 mole) in methylene chloride (500 ml.). Pivaloyloxymethyl 6-aminopenicillanate (0.1 mole) is added, and the mixture stirred at 0° C. for two hours, then filtered through diatomaceous earth. Isopropanol (150 ml.) is added to the filtrate which is then concentrated in vacuo until the product begins to separate. Isopropanol (150 ml.) and ether (350 ml.) are added to the concentrate which is cooled and filtered to give the product.

The hydrochloride salts are formed by adding an isopropanol solution of hydrochloric acid to an ethyl acetate solution of the esters. The salts are recovered by filtration and recrystallized from methanol-ethyl acetate.

In this manner, the following salts are prepared from the appropriate acids: acetate, p-toluenesulfonate, benzoate, butyrate, hydrobromide, sulfate, nitrate, 2-hydroxy-3-carboxynaphthoate, citrate, lactate, glycolate and laurate.

EXAMPLE XI

The following compounds are prepared from the appropriate acyloxy lower alkyl 6-glycylaminopenicillanate by the procedure of Example IV-A

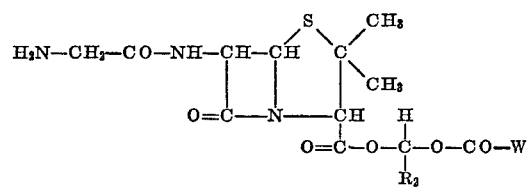

| $R_2$: | W |
|---|---|
| H | $CH(C_2H_5)_2$ |
| H | $C_6H_5$ |
| H | $4-ClC_6H_4$ |
| H | $4-(CH_3)C_6H_4$ |
| $CH_3$ | $CH_3$ |
| H | $3-FC_6H_4$ |
| H | $2-(CF_3)C_6H_4$ |
| $CH_3$ | $CH(C_2H_5)_2$ |
| H | $2-(CH_3O)C_6H_4$ |
| $C_2H_5$ | $C_2H_5$ |
| H | $4-BrC_6H_4$ |
| H | $C_2H_5$ |
| H | $CH_3$ |
| $CH_3$ | $C(CH_3)_3$ |
| $C_2H_5$ | $C_6H_5$ |
| $CH_3$ | $3-BrC_6H_4$ |
| $C_3H_7$ | $C_6H_5$ |
| H | $4-(n-C_4H_9)C_6H_4$ |

EXAMPLE XII

The following compounds are prepared from the appropriate phenylacetic acid derivative and 6-glycylaminopencillanic acid or the appropriate acyloxy(lower alkyl) ester thereof by the indicated procedures.

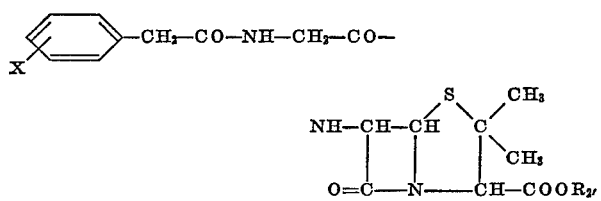

| X | R' | Procedure of example |
|---|---|---|
| H | $CH_2-O-CO-C(CH_3)_3$ | IV-A |
| H | $CH_2-O-CO-CH(C_2H_5)_2$ | IX, IV-A |
| H | $CH_2-O-CO-C_6H_5$ | IV-A |
| H | $CH_2-O-CO-CH_3$ | II |
| 2-$CH_3$ | H | IX, IV-A |
| 2-$CH_3$ | $CH_2-O-CO-C(CH_3)_3$ | II |
| 2-$CH_3$ | $CH(CH_3)-O-CO-CH_3$ | II |
| 3-$CH_3$ | H | III |
| 4-$CH_3$ | H | III |
| 4-$CH_3$ | $CH_2-O-CO-CH(C_2H_5)_2$ | III |
| 4-$CH_3$ | $CH_2-O-CO-[4-(CH_3)C_6H_4]$ | II |
| 2-Cl | H | II |

| X | R' | Procedure of example |
|---|---|---|
| 2-Cl | $CH_2-O-CO-C_3H_7$ | III |
| 3-Cl | H | IX |
| 3-Cl | $CH(C_2H_5)-O-CO-C_2H_5$ | IX, IV-A |
| 4-Cl | H | IX |
| 4-Cl | $CH_2-O-CO-C(CH_3)_3$ | III |
| 4-Cl | $CH_2-O-CO-(4-ClC_6H_4)$ | III |
| 2-$C_2H_5$ | H | IX |
| 2-$C_2H_5$ | $CH_2-O-CO-C_6H_5$ | IV-B |
| 3-$C_2H_5$ | H | VI, IX |
| 4-t-$C_4H_9$ | H | II |
| 4-t-$C_4H_9$ | $CH_2-O-CO-C(CH_3)_3$ | II |
| 4-t-$C_4H_9$ | $CH(CH_3)-O-CO-CH_3$ | III |
| 2-$OCH_3$ | H | IX |
| 2-$OCH_3$ | $CH_2-O-CO-CH(C_2H_5)_2$ | IV-A |
| 2-$OCH_3$ | $CH_2-O-CO-[2-(CF_3)C_6H_4]$ | II |
| 3-$OCH_3$ | H | IX |
| 3-$OCH_3$ | $CH(C_3H_7)-O-CO-C_6H_5$ | III |
| 4-$OCH_3$ | H | IV-B |
| 4-$OCH_3$ | $CH(CH_3)-O-CO-C(CH_3)_3$ | V, III |
| 4-$OC_2H_5$ | H | IX |
| 4-n-$OC_4H_9$ | H | III |
| 4-n-$OC_4H_9$ | $CH_2-O-CO-CH(C_2H_5)_2$ | III |
| 4-n-$OC_4H_9$ | $CH_2-O-CO-(3-FC_6H_4)$ | II |
| 4-$CF_3$ | H | IV-A |
| 4-$CF_3$ | $CH(CH_3)-O-CO-(3-BrC_6H_4)$ | II |
| 4-$CF_3$ | $CH_2-O-CO-[2-(CH_3O)C_6H_4]$ | II |
| 4-$N(CH_3)_2$ | H | III |
| 3-$N(CH_3)_2$ | $CH_2-O-CO-C(CH_3)_3$ | II |
| 3-$N(C_2H_5)_2$ | H | II |
| 3-$N(C_2H_5)_2$ | $CH_2-O-CO-[4-(n-C_4H_9)C_6H_4]$ | II |
| 2-Br | H | II |
| 2-Br | $CH_2-O-CO-CH_3$ | II |
| 3-F | H | II |
| 3-F | $CH_2-O-CO-CH_3$ | II |

Replacement of the phenylacetic acid derivatives by (3-thienyl)-acetic acid in the procedures of Examples IV and VI affords 6 - [N-(α-(3-thienyl)acetyl)glycylamino]penicillanic acid and acyloxy lower alkyl esters thereof wherein the acyloxy lower alkyl group $$(-CH(R_2)-O-CO-W)$$

is

| $R_2$ | W | $R_2$ | W |
|---|---|---|---|
| H | $C(CH_3)_3$ | H | $4-ClC_6H_4$ |
| H | $CH_3$ | $C_2H_5$ | $C_2H_5$ |
| $CH_3$ | $CH_3$ | $CH_3$ | $C_6H_5$ |
| H | $CH(C_2H_5)_2$ | | |
| H | $C_6H_5$ | | |

EXAMPLE XIII

6-[N-(α-phenyl-α-carboxyacetyl)glycylamino]penicillanic acid esters (acylation via arylcarboxy ketene esters)

Phenylchlorocarbonyl ketene (0.01 mole) is dissolved in a sufficient volume of methylene chloride to provide a clear solution. The solution is maintained under an atmosphere of nitrogen, stirred and cooled to 0° C.–5° C., care being taken to exclude moisture. Phenol (0.01 mole) is added and the mixture stirred for one hour to give the phenyl ester of phenylcarboxy ketene. The solution is cooled to —20° C. and a solution of the triethylamine salt of 6-glycylaminopenicillanic acid (0.01 mole) in methylene chloride (50 ml.) added. The reaction mixture is stirred for ten minutes at —20° C., then allowed to warm to room temperature. The product is isolated by the procedure of Example II.

The following compounds are prepared in like manner from the appropriate phenylcarboxy ketene ester and 6- glycylaminopenicillanic acid compound. (Preparation of the phenylcarboxy ketene esters is taught in U.S. Patent 3,574,189, issued Apr. 6, 1971.)

EXAMPLE XIV

Repetition of the procedure of Example XIII but using the appropriate acyloxy lower alkyl ester of 6-glycyl-

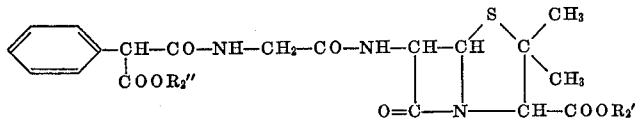

methyl
t-butyl
dodecyl
2-isopropylphenyl
4-methoxyphenyl
2-ethoxyphenyl
3,4-dimethylphenyl
4-chloro-2-methylphenyl
4-chloro-2,3-dimethylphenyl
2-methoxy-4-methylphenyl
4-indanyl
5-indanyl
1-tetrahydronaphthyl
benzyl
4-chlorobenzyl
benzhydryl
3-(1-benzylpiperidyl)
1-ethoxy-2,2,2-trichloroethyl
phenylpropargyl
cinnamyl
2-(di-n-butyl)aminoethyl
2-(N-ethylanilino)propyl
2-pyrrolidinoethyl aminopenicillanic acid in place of 6-glycylaminopenicillanic acid produces the following compounds wherein $R_2''$ has the values given in Example XIII and $R_2'$, for each of the $R_2''$ values, is —$CH_2$—O—CO—$CH_3$
—$CH_2$—O—CO—$C(CH_3)_3$
—$CH_2$—O—CO—$CH(C_2H_5)_2$
—$CH_2$—O—CO—$C_6H_5$
—$CH(CH_3)$—O—CO—$CH_3$
—$CH_2$—O—CO—$C_3H_7$
—$CH(C_2H_5)$—O—CO—$C_6H_5$
—$CH(CH_3)$—O—CO—$CH(C_2H_5)_2$

EXAMPLE XV

6-[N-(α-aryl-α-carboxyacetyl)glycylamino] penicillanic acid esters

The procedure of Example XIII is repeated but using the appropriate arylcarboxy ketene ester and the appropriate 6-glycylaminopenicillanic acid or acyloxy lower alkyl ester thereof, 6-(α-carboxy ester)glycylaminopenicillanic acid or acyloxy lower alkyl esters thereof as reactants to provide the following compounds

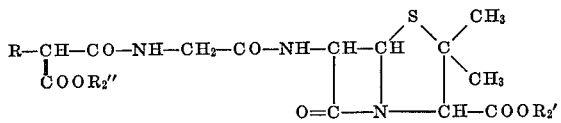

| R | $R_2''$ | $R_2'$ |
|---|---|---|
| $C_6H_5$ | 2-isopropylphenyl | H |
| $C_6H_5$ | 5-indanyl | $CH_2$—O—CO—$C(CH_3)_3$ |
| 3-thienyl | Hexyl | H |
| Do | p-Tolyl | $CH_2$—O—CO—$C_6H_5$ |
| Do | 2-4,dichlorophenyl | $CH_2$—O—CO—$CH_3$ |
| m-Tolyl | Phenyl | H |
| p-Tolyl | Benzyl | $CH(CH_3)$—O—CO—$CH_3$ |
| 2-$ClC_6H_4$ | 1-naphthyl | H |
| 4-$FC_6H_4$ | 4-ethoxyphenyl | $CH(CH_3)$—O—CO—$CH_3$ |
| 3-[$(C_2H_5)_2$N]$C_6H_4$ | Piperidinomethyl | $CH_2$—O—CO—$C_6H_5$ |
| 4-$(CF_3)C_6H_4$ | Allyl | H |
| 2-$(CH_3O)C_6H_4$ | Benzyl | H |
| 2-(n-$C_4H_9O)C_6H_4$ | Methyl | $CH_2$—O—CO—(4-$ClC_6H_4$) |
| $C_6H_5$ | 2-morpholinoethyl | H |
| $C_6H_5$ | Cinnamyl | $CH_2$—O—CO—[2-$(CH_3)C_6H_4$] |
| 4-(t-$C_4H_9)C_6H_4$ | t-Butyl | $CH_2$—O—CO—$CH_3$ |
| 4-$(C_4H_9O)C_6H_4$ | 2-diethylaminoethyl | $CH(CH_3)$—O—CO—$CH_3$ |
| 4-$ClC_6H_4$ | 2,2,2-trichloroethyl | H |
| 4-[$(CH_3)_2$N]$C_6H_4$ | 3,5-dimethylphenyl | H |
| 3-$BrC_6H_4$ | 2-biphenyl | $CH_2$—O—CO—$C(CH_3)_3$ |

Hydrolysis of the phenyl and substituted phenyl esters according to the procedure of Example VIII converts them to the corresponding disodium salt. The benzyl and substituted benzyl esters are converted to the free acids by catalytic hydrogenation and then to the disodium salts by neutralization.

The phenyl and substituted phenyl esters are converted to the corresponding disodium salts by the hydrolysis procedure of Example VIII and to the acid forms thereof by the procedure of Example XVII. The benzyl esters are converted to the corresponding acid derivatives by catalytic hydrogenation. The mono- and/or disodium salts are then produced by treating the mono- and/or diacid derivative with one or two equivalents of sodium hydroxide.

EXAMPLE XVI

Bis(acyloxy lower alkyl)-6-{N-[(α-carboxy)arylacetyl]-glycylamino}penicillanates The 6 - N - [(α-carboxy)arylacetyl]glycylaminopenicillanic acid disodium salt (0.005 mole) is stirred in N,N-dimethylformamide (25 ml.) and the appropriate chloro(lower alkyl) organic acid ester (0.015 mole) added. Sodium iodide (2 equivalents) is added and the mixture stirred overnight at room temperature, then evaporated in vacuo. The residue is dissolved in acetone, the sodium chloride filtered off, and the filtrate concentrated to give the product.

The bis(acyloxy lower alkyl) esters tabulated below are prepared from the appropriate chloro(lower alkyl) organic acid ester, $ClCH(R_2)$—O—CO—W, and the appropriate penicillin of Example XV wherein $COOR_2''$ and $COOR_2'$ are —COONa.

R—CH—CO—NH—CH$_2$—CO—
|
O=C—O—CH—O—CO—W

S    CH$_3$
              / \  /
NH—CH—CH    C
              \ / \
               |   CH$_3$
O=C—N—CH—C—O—CH—O—CO—W
           ‖      |
           O     R$_2$

| R | R$_2$ | W |
|---|---|---|
| C$_6$H$_5$ | H | CH$_3$ |
| C$_6$H$_5$ | H | C(CH$_3$)$_3$ |
| C$_6$H$_5$ | CH$_3$ | CH$_3$ |
| C$_6$H$_5$ | H | C$_6$H$_5$ |
| 4-(CH$_3$)C$_6$H$_4$ | H | C$_2$H$_5$ |
| 4-(CH$_3$)C$_6$H$_4$ | C$_2$H$_5$ | C$_6$H$_5$ |
| 4-(t-C$_4$H$_9$)C$_6$H$_4$ | CH$_3$ | CH$_3$ |
| 2-(CH$_3$O)C$_6$H$_4$ | H | CH(CH$_3$)$_2$ |
| 4-(C$_4$H$_9$O)C$_6$H$_4$ | H | CH(C$_2$H$_5$)$_2$ |
| 4-(CF$_3$)C$_6$H$_4$ | H | 4-ClC$_6$H$_4$ |
| 4-(CF$_3$)C$_6$H$_4$ | H | CH$_3$ |
| 2-ClC$_6$H$_4$ | H | C$_3$H$_7$ |
| 2-ClC$_6$H$_4$ | H | C$_6$H$_5$ |
| 4-ClC$_6$H$_4$ | H | CH$_3$ |
| 4-ClC$_6$H$_4$ | CH$_3$ | CH$_3$ |
| 4-[(CH$_3$)$_2$N]C$_6$H$_4$ | H | C(CH$_3$)$_3$ |
| 3-BrC$_6$H$_4$ | CH$_3$ | CH$_3$ |
| 3-thienyl | H | C(CH$_3$)$_3$ |
| Do | H | C$_6$H$_5$ |
| Do | CH$_3$ | CH$_3$ |
| Do | H | C$_3$H$_7$ |

EXAMPLE XVII

The salts of the penicillin products of Example I through XVI are transformed to their acid forms by careful neutralization of aqueous solutions thereof with Dowex 50, acid form (a strong cation-exchange, sulfonated, polystyrene resin available from The Dow Chemical Co.) and lyophilized after filtration to give the free acids.

The free acids of the preceding examples are transformed to their monosodium, calcium, magnesium, ammonium, procaine, N,N'-dibenzylethylenediamine, N-ethylpiperidine, dibenzylamine, 1-ephenamine, triethylamine, N-benzyl-β-phenethylamine, N,N'-bis(dehydroabietyl)ethylenediamine and benzhydrylamine salts by reaction of aqueous solutions thereof with one equivalent of the appropriate base per acid group present. The salts are recovered by freeze-drying.

EXAMPLE XVIII

A tablet base is prepared by blending the following ingredients in the proportion by weight indicated:

| | |
|---|---|
| Sucrose | 80.0 |
| Tapioca starch | 12.5 |
| Magnesium stearate | 7.5 |

Sufficient 6-[N-(phenylacetyl)glycylamino]penicillanic acid is blended into the base to provide tablets containing 25, 100, and 250 mg. of active ingredient.

EXAMPLE XIX

Capsules containing 25, 100, and 250 mg. of active ingredient are prepared by blending pivaloyloxymethyl 6-[N-(phenylacetyl)glycylamino]penicillanate in the following mixture (proportions given in parts by weight):

| | |
|---|---|
| Calcium carbonate, U.S.P. | 17.5 |
| Dicalcium phosphate | 18.9 |
| Magnesium trisilicate | 4.2 |
| Lactose, U.S.P | 6.2 |
| Potato starch | 5.2 |
| Magnesium stearate | 1.0 |

EXAMPLE XX

A suspension of 6-[N-(p-tolylacetyl)glycylamino]penicillanic acid sodium salt is prepared with the following composition:

| | G. |
|---|---|
| Penicillin | 31.42 |
| 70% aqueous sorbitol | 714.29 |
| Glycerine, U.S.P. | 185.35 |
| Polyvinyl pyrrolidione | 0.50 |
| Propyl parahydroxybenzoate | 0.172 |
| Distilled water to make one liter | 0.094 |

Gum acacia (10% solution): 100.00 ml.

Various sweetening and flavoring agents may be added to this suspension, as well as acceptable coloring. The suspension contains approximately 25 mg. of penicillin compound per milliliter.

EXAMPLE XXI

A parenteral form of 6-[N-(α-phenyl-α-carboxyacetyl)glycylamino]penicillanic acid is prepared by dissolving an intimate mixture of the disodium salt of the penicillin compound and sodium citrate (4 percent by weight) in sufficient polyethylene glycol 200 such that the final concentration of the penicillin compound is 25 mg. of active ingredient per milliliter. The resulting solution is sterilized by filtration and sterilely stoppered in vials.

In like manner, formulations of the products of this invention are made.

What is claimed is:

1. A compound having the formula

S    CH$_3$
             / \  /
R—CH—CO—NH—CH$_2$—CO—NH—CH—CH    C
|                                  \ / \
R$_1$                                 |   CH$_3$
              O=C—N—CH—COOR$_2$' wherein R is selected from the group consisting of 3-thienyl, phenyl and substituted phenyl wherein the substituent is selected from the group consisting of lower alkyl, lower alkoxy, chloro, bromo, fluoro, trifluoromethyl and di(lower alkyl)amino;

R$_1$ is selected from the group consisting of hydrogen, carbophenoxy, carbo(2-isopropylphenoxy), carbo(5-indanyloxy), carbobenzoxy and COOR$_2$';

R$_2$' is selected from the group consisting of hydrogen and asyloxy(lower alkyl) of the formula

—CH(R$_2$)—O—CO—W wherein R$_2$ is selected from the group consisting of hydrogen and lower alkyl; and W is selected from the group consisting of lower alkyl, phenyl and substituted phenyl wherein the substituent is selected from the group consisting of chloro, bromo, fluoro, lower alkyl, lower alkoxy and trifluoromethyl;

and the non-toxic salts of said compound wherein at least one of R$_1$ and —COOR$_2$' is —COOH.

2. A compounds according to claim 1 wherein R is 3-thienyl; R$_1$ is hydrogen; and R$_2$' is acyloxy(lower alkyl).

3. A compound according to claim 1 wherein R is phenyl; R$_1$ is carboxy; and R$_2$' is acyloxy(lower alkyl).

4. A compound according to claim 1 wherein R is phenyl; $R_2'$ is acyloxy(lower alkyl); and $R_1$ is —$COOR_2'$.

5. Acetoxyethyl 6-[N-((3-thienyl)acetyl)glycylamino]penicillanate, a compound according to claim 7 wherein R is 3-thienyl; $R_1$ is hydrogen; and $R_2'$ is

—CH($CH_3$)—O—CO—$CH_3$

6. Pivaloyloxymethyl 6-[(N-(α-carboxy)phenylacetyl)glycylamino]penicillanate, a compound according to claim 8 wherein R is phenyl; $R_1$ is carboxy; and $R_2'$ is —$CH_2$—O—CO—C($CH_3$)$_3$.

7. Bis(pivaloyloxymethyl) 6-[(N-(α-phenyl-α-carboxyacetyl)glycylamino]penicillanate, a compound according to claim 9 wherein R is phenyl; $R_2'$ is

—$CH_2$—O—CO—C($CH_3$)$_3$ and $R_1$ is —$COOR_2'$.

8. Bis(acetoxymethyl) 6 - [N-(α-phenyl-α-carboxyacetyl)glycylamino]penicillanate, a compound according to claim 9 wherein R is phenyl; $R_2'$ is

—$CH_2$—O—CO—$CH_3$ and $R_1$ is —$COOR_2'$.

References Cited
UNITED STATES PATENTS 3,532,688   10/1970   Hatt et al. _____ 260—239.1

NICHOLAS S. RIZZO, Primary Examiner

U.S. Cl. X.R.

424—271

UNITED STATES PATENT OFFICE
CERTIFICATE OF CORRECTION

Patent No. 3,770,722        Dated November 6, 1973

Inventor(s) Gene M. Bright and Ernest S. Hamanaka

It is certified that error appears in the above-identified patent and that said Letters Patent are hereby corrected as shown below:

Col. 13, line 17, above "methyl" on line 18, insert -- $R_2$" ($R_2$'=H) --.

Col. 15, lines 24-27, that portion of the formula reading

"$O=\overset{|}{C}-O-CH-O-CO-W$" should read -- $O=\overset{|}{C}-O-CH-O-CO-W$ --.
$$\underset{R_2}{|}$$

Col. 17, line 4, "7" should read -- 2 --.

Col. 17, line 9, "8" should read -- 3 --.

Col. 17, line 13, "9" should read -- 4 --.

Col. 18, line 3, "9" should read -- 4 --.

Signed and sealed this 16th day of July 1974.

(SEAL)
Attest:

McCOY M. GIBSON, JR.
Attesting Officer

C. MARSHALL DANN
Commissioner of Patents